United States Patent
Ivers

(10) Patent No.: US 9,932,911 B2
(45) Date of Patent: Apr. 3, 2018

(54) PROPANE FUEL SUPPLEMENT SYSTEM AND METHOD

(71) Applicant: Gary L. Ivers, Indian Lake Estates, FL (US)

(72) Inventor: Gary L. Ivers, Indian Lake Estates, FL (US)

( * ) Notice: Subject to any disclaimer, the term of this patent is extended or adjusted under 35 U.S.C. 154(b) by 134 days.

(21) Appl. No.: 14/994,990

(22) Filed: Jan. 13, 2016

(65) Prior Publication Data

US 2016/0201580 A1 Jul. 14, 2016

Related U.S. Application Data

(60) Provisional application No. 62/102,919, filed on Jan. 13, 2015.

(51) Int. Cl.
| | |
|---|---|
| *F02D 19/06* | (2006.01) |
| *F02D 41/00* | (2006.01) |
| *F02D 41/30* | (2006.01) |

(52) U.S. Cl.
CPC ..... *F02D 19/0605* (2013.01); *F02D 19/0647* (2013.01); *F02D 19/0665* (2013.01); *F02D 19/0678* (2013.01); *F02D 19/0681* (2013.01); *F02D 41/0025* (2013.01); *F02D 41/3094* (2013.01); *F02D 2400/11* (2013.01); *Y02T 10/36* (2013.01)

(58) Field of Classification Search
CPC .... B60K 2015/0631; B60K 2015/0634; B60K 2015/0638; F02D 41/3094; F02D 2400/11; F02D 19/0647; F02D 19/0665; F02D 19/0605

See application file for complete search history.

(56) References Cited

U.S. PATENT DOCUMENTS

| | | | | | |
|---|---|---|---|---|---|
| 3,698,365 | A | * | 10/1972 | Hallberg | F02D 9/08 123/27 GE |
| 4,632,083 | A | * | 12/1986 | Reggiani | F02B 43/00 123/27 GE |

(Continued)

FOREIGN PATENT DOCUMENTS

| | | | | | |
|---|---|---|---|---|---|
| CA | 1185852 | A | * | 4/1985 | ............ F02B 43/00 |
| WO | WO 03048555 | A1 | * | 6/2003 | ......... F02D 19/0647 |

OTHER PUBLICATIONS

"Understanding your propane tank", article dated Jun. 1, 2012, www.propane101.com; retrieved Jul. 6, 2017.*

*Primary Examiner* — James A Shriver, II
*Assistant Examiner* — Steve Clemmons
(74) *Attorney, Agent, or Firm* — Curatolo Sidoti Co., LPA; Salvatore A. Sidoti; Peter J. Beardsley

(57) ABSTRACT

A propane injection system for supplementing gasoline or diesel engines in vehicles such as automobiles and marine vessels. The invention would also be appropriate for use in turbines and jet engines by providing a secondary fuel source for improved fuel economy. A propane tank is mounted into the vehicle, such as within a cavity within the trunk of an automobile, and is connected to the air intake, exhaust, and turbo charger of the vehicle's stock engine system. A switch is used to activate the injection of propane directly into the engine cycle at two points to increase engine performance. The switch could be incorporated into an existing switch, such as the cruise control of an automobile, and may be canceled by depressing the brake pedal of the vehicle.

15 Claims, 6 Drawing Sheets

(56) References Cited

U.S. PATENT DOCUMENTS

| | | | | |
|---|---|---|---|---|
| 4,878,475 | A * | 11/1989 | Birsa | F02B 7/06 123/525 |
| 4,953,515 | A * | 9/1990 | Fehr | F02B 7/06 123/383 |
| 5,499,615 | A * | 3/1996 | Lawrence | F02B 43/00 123/526 |
| 6,227,230 | B1 * | 5/2001 | Huh | B60K 15/03006 137/255 |
| 6,371,092 | B1 * | 4/2002 | Guglielmo | F02D 35/0092 123/435 |
| 6,422,015 | B2 | 7/2002 | Long | |
| 6,901,889 | B1 * | 6/2005 | Ritter | F02D 19/0607 123/27 GE |
| 7,591,253 | B2 * | 9/2009 | Martindale | F02D 19/081 123/27 GE |
| 7,841,322 | B2 * | 11/2010 | Bach | F02B 29/0418 123/480 |
| 8,117,839 | B2 | 2/2012 | Ridgway et al. | |
| 9,291,109 | B2 * | 3/2016 | Jaasma | F02D 19/0647 |
| 9,435,288 | B2 * | 9/2016 | Cohn | F02D 41/3094 |
| 9,574,490 | B2 * | 2/2017 | Watanabe | F02B 37/013 |
| 9,581,113 | B2 * | 2/2017 | Bandyopadhyay | F02M 61/14 |
| 9,676,423 | B2 * | 6/2017 | Hulbert | B60K 15/07 |
| 2012/0175914 | A1 * | 7/2012 | De Luca | B62D 25/2027 296/193.04 |
| 2014/0309909 | A1 * | 10/2014 | McMahon | F02D 19/0628 701/103 |

\* cited by examiner

PROPANE FUEL SUPPLEMENT SYSTEM AND METHOD

CROSS-REFERENCE TO RELATED APPLICATION

This application claims priority in U.S. Provisional Patent Application No. 62/102,919 Filed Jan. 13, 2015, which is incorporated herein by reference.

BACKGROUND OF THE INVENTION

1. Field of the Invention

The present invention relates generally to a fuel supplement system and method for use thereof, and more specifically to a controllable propane injection system for a gasoline or diesel engine to improve the fuel efficiency performance thereof.

2. Description of the Related Art

Despite recent trends in developing alternatives to increase the fuel performance of standard combustion engines in vehicles, gasoline and diesel engines remain the primary source to power automobiles. This is even more evident for large delivery and transport vehicles. What is needed is a simple system which can be retrofitted into any gasoline or diesel powered automobile, marine craft, or other vehicle, which provides increased fuel performance.

Heretofore there has not been available a system or method for injecting propane into a gasoline or diesel engine system with the advantages and features of the present invention.

BRIEF SUMMARY OF THE INVENTION

The present invention generally provides a propane injection system for supplementing gasoline or diesel engines in vehicles such as automobiles and marine vessels. The invention would also be appropriate for use in turbines and jet engines by providing a secondary fuel source for improved fuel economy. A propane tank is mounted into the vehicle, such as within a cavity within the trunk of an automobile, and is connected to the air intake, exhaust, and turbo charger of the vehicle's stock engine system. A switch is used to activate the injection of propane directly into the engine cycle at two points to increase engine performance. The switch could be incorporated into an existing switch, such as the cruise control of an automobile, and may be canceled by depressing the brake pedal of the vehicle.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

The present invention has applicability to many, if not all, power-producing systems. For the purposes of this application, the word "engine" could mean a diesel engine, a gasoline engine, a jet engine, a turbine, or any such internal combustion engine or power source which may be used to generate energy which can benefit from increased fuel efficiency from a base fuel source by supplementing with propane. The term "vehicle" can mean any type of vehicle which may be propelled by the above-defined "engine." This includes, but is not limited to, automobiles, trucks, transport vehicles, marine vehicles, and aircraft.

II. Preferred Embodiment Propane Supplement System 2

Figure 1:
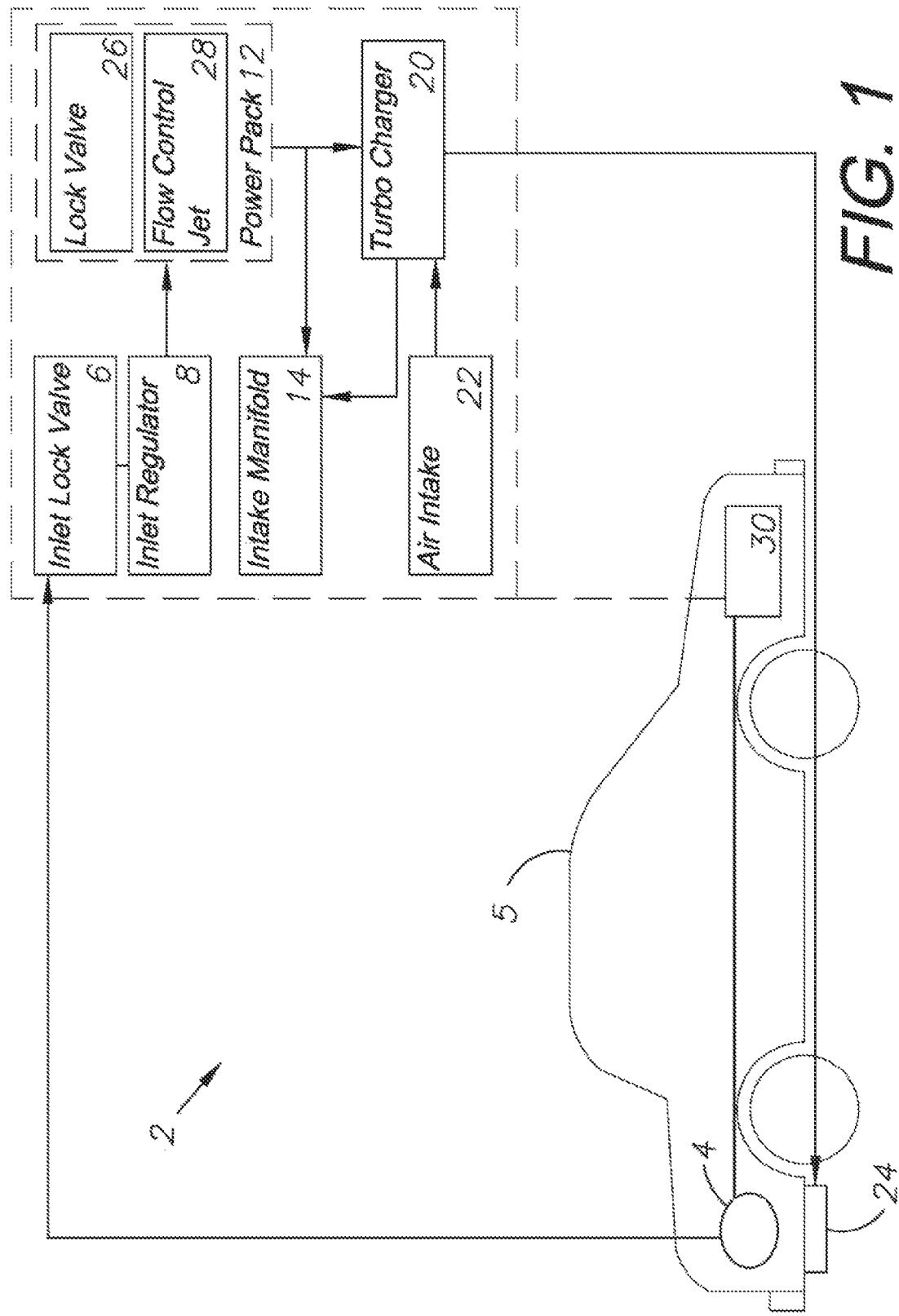
FIG. 1 is a diagrammatic representation of an embodiment of the present invention as displaced within a typical environment.

Referring to the figures in more detail, FIG. 1 provides a diagrammatic representation of a preferred embodiment propane supplement system 2 deployed within a vehicle 5. A propane tank 4 is stored in the trunk or elsewhere on the vehicle. The vehicle includes a gasoline or diesel engine 30 already installed within the vehicle. The vehicle could alternatively be a marine vessel or any other vehicle with a diesel or gasoline engine for locomotion. This would also include turbines and jet engines, such as a kerosene-powered turbine. The vehicle 5 includes an engine 30 which is powered by a base fuel (e.g. gasoline or diesel), which fuel consumption of the base fuel is improved significantly by activating the propane supplement system 2.

Figure 2:
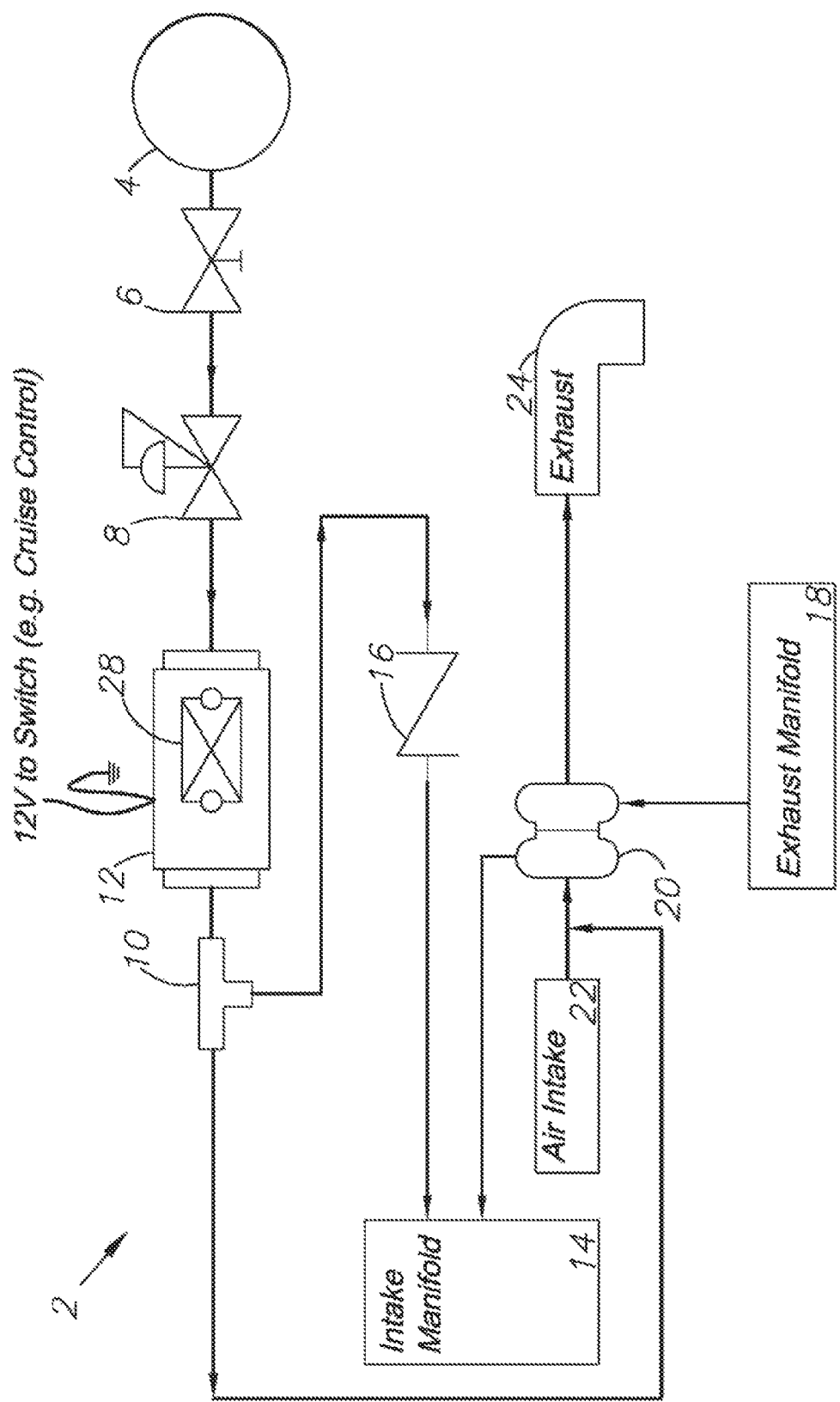
FIG. 2 is a line diagram showing a preferred embodiment of the present invention.

As shown in FIG. 1 and in more detail in FIG. 2, propane vapor is drawn out of the tank 4 into an inlet lock valve 6 and then into a high pressure regulator valve 8. The regulator valve may be set at, for example, 30 PSI. From there, the vapor enters a power pack 12 which primarily comprises another lock out valve 26 and a flow control jet 28 for introducing the proper amount of propane vapor into the air intake system. The power pack 12 is connected to a 12 v switch and to a ground wire. The 12 v switch preferably is the existing cruise control switch for a ground-based vehicle or a similar switch (or standalone switch) for a marine vessel or other vehicle.

From here, a tee 10 separates the flow of the propane through two routes into the intake manifold. One route diverts the propane directly into the intake manifold 14 of the stock engine 30 via a check valve 16. The rest of the propane flows between the air intake 22 and a turbo charger 20, before entering the turbo charger. The propane is combined with the air and other fuel vapors through the air intake 22 and is again fed through the super charger 20 before exiting the system via the exhaust 24. The exhaust manifold 18 also feed the turbo charger 20 as is typical of such a system.

Figure 3:
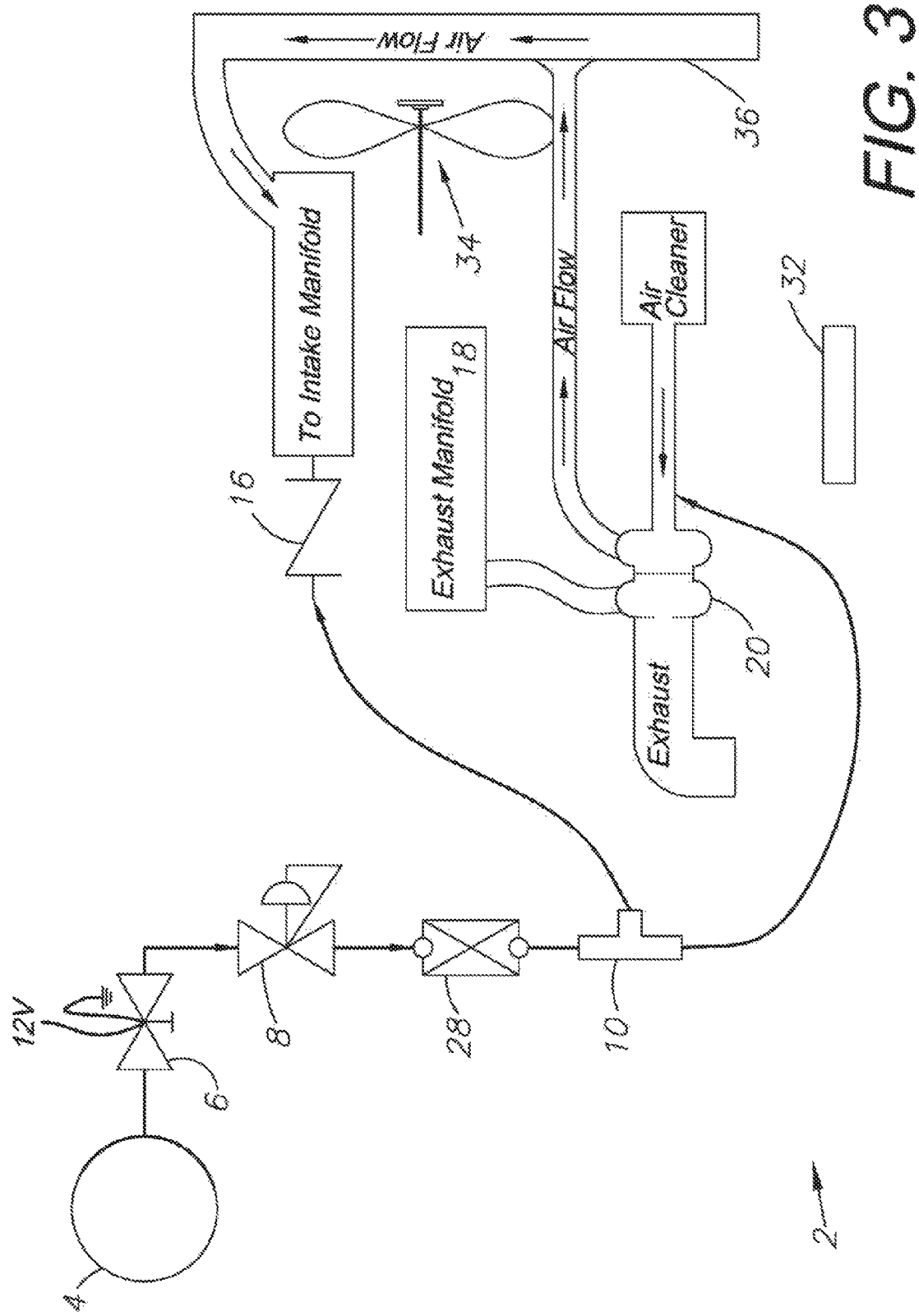
FIG. 3 is another line diagram showing a slightly alternative orientation of the preferred embodiment of the present invention.

FIG. 3 shows a slightly alternative arrangement. Here, the switch is connected to the initial lock out valve 6, and the power pack is separated out into its individual components. FIG. 3 also shows a better orientation of the elements of the present invention in relation to the existing engine components, including the oil pan 32, the fan 34, and the radiator 36, as well as the flow of air through the system 2.

Figure 4:
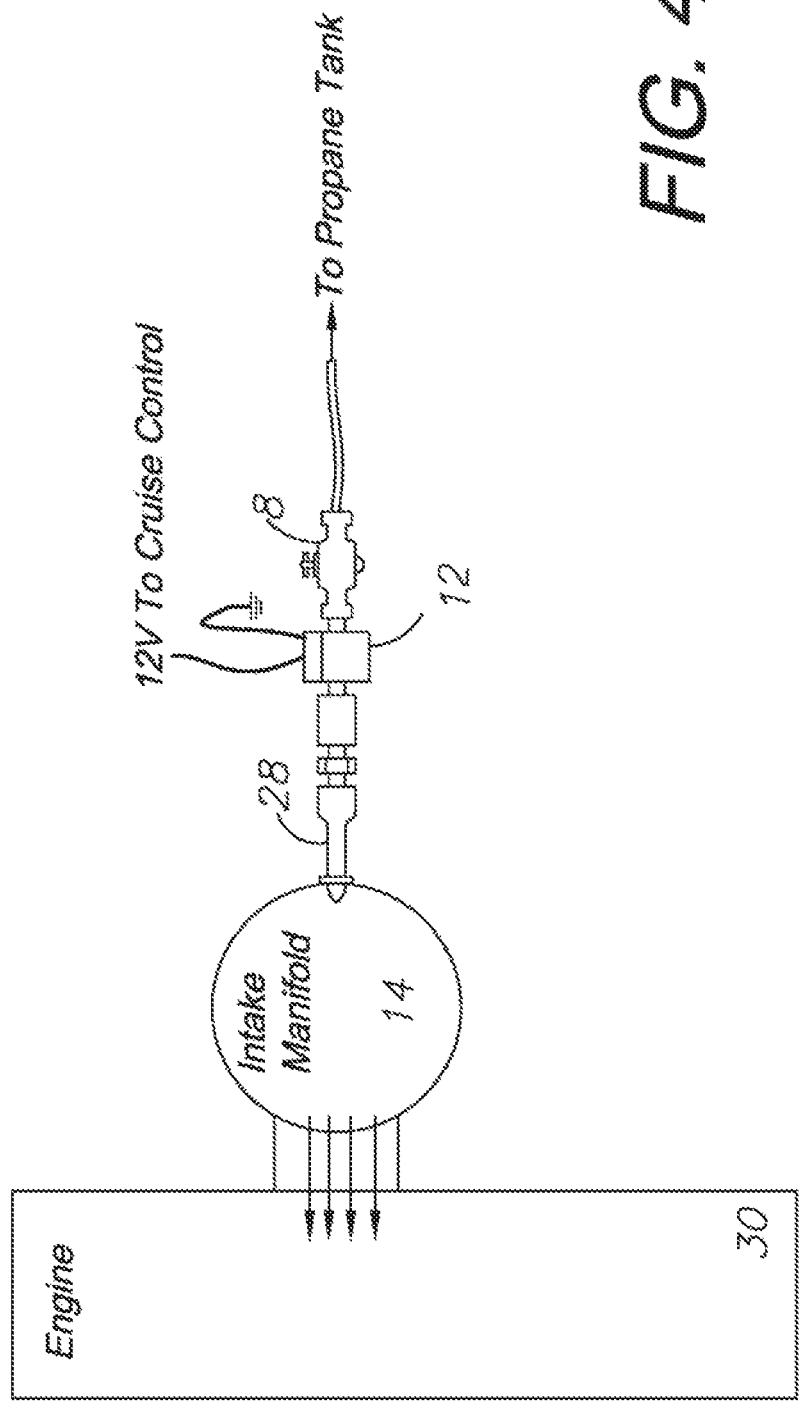
FIG. 4 shows a diagrammatic elevation encompassing a portion of a preferred embodiment of the present invention.

FIG. 4 shows a more detailed orientation of several of the components of the present invention as they are used to provide propane vapor to the intake manifold and then on into the engine.

Figure 5:
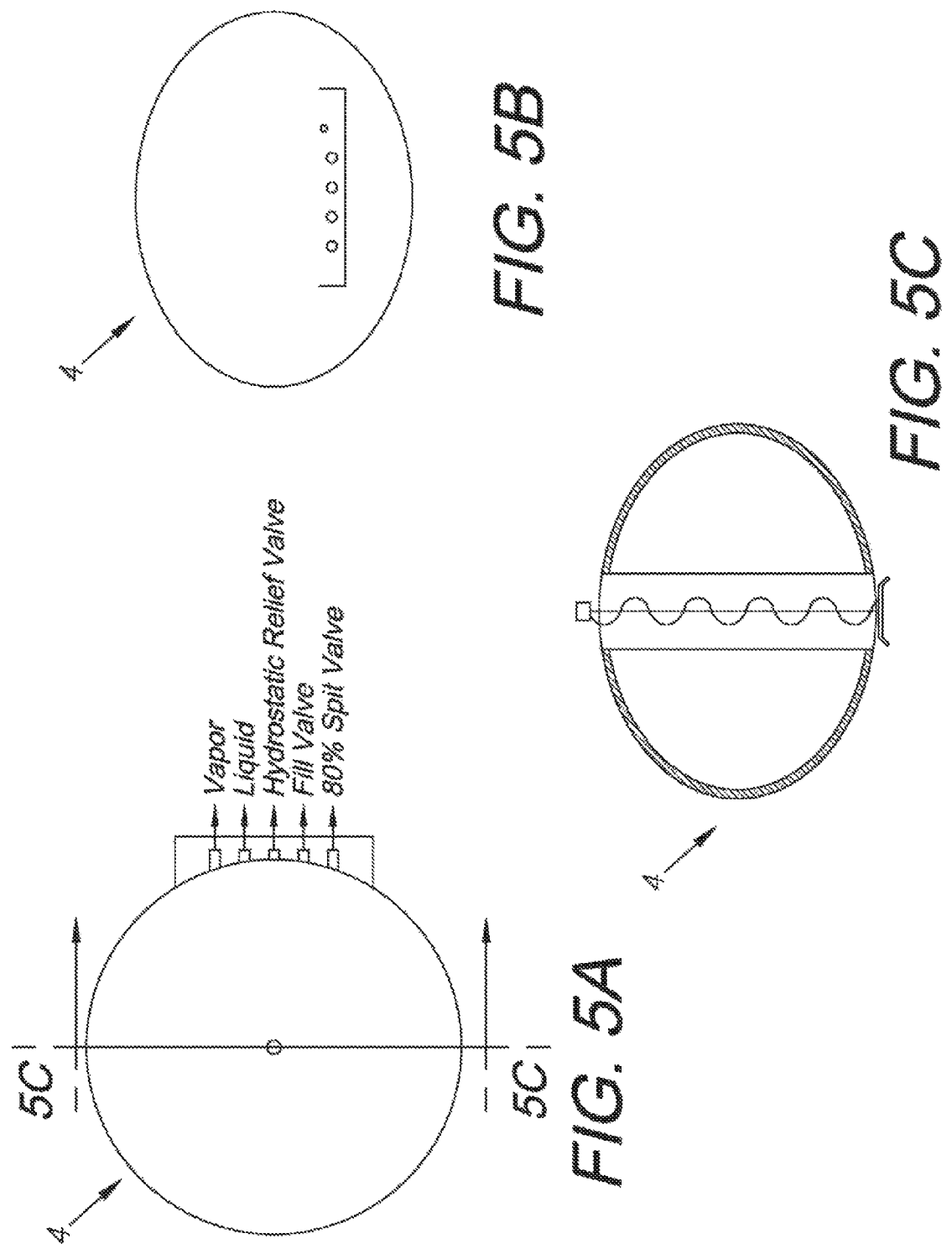
FIG. 5A shows a top-plan view of a portion of an embodiment of the present invention including a propane tank.
FIG. 5B is a front elevational view thereof.
FIG. 5C is a sectional view thereof, taken about the line in FIG. 5A.

FIGS. 5A-5C show various views of a propane tank 4 specifically suited for the present invention. The tank is designed to be stored within a vehicle securely, such as beneath a trunk floor. The tank 4 includes several ports, including a liquid-out port, a vapor-out port, a hydrostatic relief valve, a fill valve for refilling the tank, and an 80% spit valve which ensures the tank is not overfilled with liquid.

III. Multi-Stage Propane Supplement System 52

Figure 6:
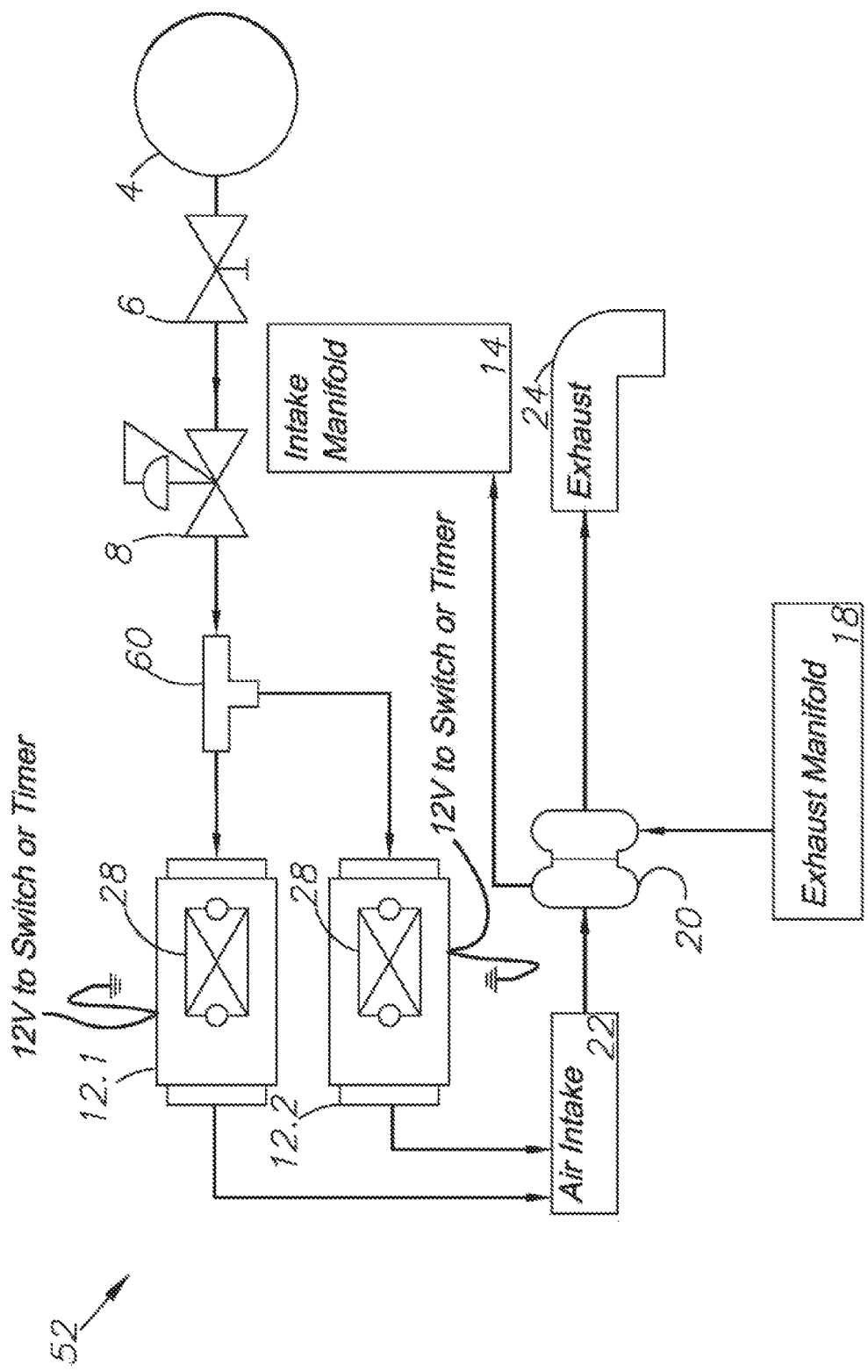
FIG. 6 is a line diagram showing an alternative embodiment of the present invention including multiple stages.

FIG. 6 shows an example of a multi-stage propane supplement system 52 which is very similar to the embodiment disclosed previously. However, a tee 60 is placed after the regulator valve 8 which splits the flow of the propane to a first power pack 12.1 and a second power pack 12.2. Additional power packs could also be incorporated with additional splits to the line. Each power pack is connected to a manual switch or a timer or to the cruise control activation as indicated in the previous embodiment. Each power pack then flows directly into the air intake. Each successive power pack activated will increase fuel efficiency of the vehicle.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A propane supplement system for a vehicle; the system comprising:
    a vehicle engine system comprising an intake manifold, an air intake, a turbo charger, an exhaust manifold, and an exhaust, said vehicle engine system having a base fuel economy;
    a propane tank configured to provide propane vapor through the system;
    a lock valve connected to said propane tank;
    a pressure regulator valve connected to said lock valve;
    a power pack connected to said pressure regulator valve, said power pack including a flow control jet and a second lock out valve;
    a switch electrically connected to said power pack, said switch configured to begin a flow of propane from said power pack;
    a splitter connected to said power pack, said splitter configured to split the flow of said propane into at least two directions including a first direction and a second direction;
    said first direction connecting said splitter between said air intake and said turbo charger;
    said second direction connecting said splitter to a check valve;
    said check valve connected to said intake manifold;
    whereby said propane tank injects propane into said vehicle engine system; and whereby said base fuel economy of said vehicle engine system is raised to increase the fuel efficiency of said engine system.

2. The propane supplement system of claim 1, wherein said base fuel of said vehicle engine system comprises a fuel selected from the list comprising: gasoline; diesel; and kerosene.

3. The propane supplement system of claim 1, further comprising:
    a vehicle powered by said vehicle engine system, said vehicle including a storage compartment; and
    said propane tank installed beneath said storage compartment.

4. The propane supplement system of claim 3, further comprising:
    said propane tank including a first valve comprising a liquid-propane-out port;
    said propane tank further including a second valve comprising a vapor-propane-out port;
    said propane tank further including a third valve comprising a hydrostatic relief valve;
    said propane tank further including a fourth valve comprising a fill valve; and
    said propane tank further including a fifth valve comprising an 80% spit valve configured to prevent overfill of said propane tank with liquid propane.

5. The propane supplement system of claim 1, further comprising:
    a vehicle powered by said vehicle engine system; said vehicle including a cruise control system including a cruise control activation switch; and
    wherein said switch electrically connected to said power pack comprises said cruise control activation switch.

6. The propane supplement system of claim 5, further comprising:
    a sensor configured to sense a depression of a brake pedal of said vehicle; and said sensor configured to deactivate said cruise control activation switch; thereby deactivating said propane supplement system.

7. The propane supplement system of claim 1, wherein said pressure regulator valve regulates the pressure of propane vapor entering said power pack at 30 pounds per square inch (PSI).

8. A propane supplement system for a vehicle, the system comprising:
    a vehicle engine system comprising an intake manifold, an air intake, a turbo charger, an exhaust manifold, and an exhaust, said vehicle engine system having a base fuel economy;
    a propane tank configured to provide propane vapor through the system;
    a lock valve connected to said propane tank;
    a pressure regulator valve connected to said lock valve;

a first power pack connected to said pressure regulator valve, said first power pack including a flow control jet and a second lock out valve;

a second power pack connected to said pressure regulator valve, said second power pack including a flow control jet and a second lock out valve;

a first switch electrically connected to said first power pack, said first switch configured to begin a flow of propane from said first power pack;

a second switch electrically connected to said second power pack said second switch configured to begin a flow of propane from said second power pack;

said first power pack and said second power pack connected directly to said air intake of said vehicle engine system;

whereby said propane tank injects propane into said vehicle engine system; and whereby said base fuel economy of said vehicle engine system is raised to increase the fuel efficiency of said engine system, wherein a vehicle is powered by said vehicle engine system, said vehicle including a cruise control system including a cruise control activation switch; and wherein said first switch comprises said cruise control activation switch.

9. The propane supplement system of claim 8, wherein said base fuel of said vehicle engine system comprises a fuel selected from the list comprising: gasoline, diesel, and kerosene.

10. The propane supplement system of claim 8, further comprising:
a vehicle powered by said vehicle engine system, said vehicle including a storage compartment; and
said propane tank installed beneath said storage compartment.

11. The propane supplement system of claim 10, further comprising:
said propane tank including a first valve comprising a liquid-propane-out port;
said propane tank further including a second valve comprising a vapor-propane-out port;
said propane tank further including a third valve comprising a hydrostatic relief valve; said propane tank further including a fourth valve comprising a fill valve; and
said propane tank further including a fifth valve comprising an 80% spit valve configured to prevent overfill of said propane tank with liquid propane.

12. The propane supplement system of claim 8; further comprising:
a sensor configured to sense a depression of a brake pedal of said vehicle; and said sensor configured to deactivate said cruise control activation switch, thereby deactivating said first power pack.

13. A method of increasing the fuel economy of a vehicle engine system comprising an intake manifold, an air intake, a turbo charger, an exhaust manifold, and an exhaust, said vehicle engine system having a base fuel economy, the method comprising the steps:
installing a propane tank into a vehicle;
connecting said propane tank to a lock valve;
connecting said lock valve to a pressure regulator valve;
connecting said pressure regulator valve to a power pack; said power pack including a flow control jet and a second lock out valve;
connecting a switch to said power pack, said switch configured to activate a flow of propane from said power pack;
connecting said power pack to a splitter, said splitter having at least two outputs including a first output and a second output;
connecting said first output of said splitter between the air intake and the turbo charger of said vehicle engine system;
connecting said second output of said splitter to a check valve;
connecting said check valve to the intake manifold of said vehicle engine system;
operating said vehicle;
activating said switch;
flowing propane into said intake manifold from said check valve and from said turbo charger; and
increasing said base fuel economy of said vehicle engine system.

14. The method of claim 13, further comprising the steps:
said vehicle including a cruise control system including a cruise control activation switch;
wherein said switch comprises said cruise control activation switch;
operating said vehicle to a desired speed;
activating said cruise control activation switch; and thereby activating said power pack.

15. The method of claim 14, further comprising the steps:
depressing a brake pedal of said vehicle, thereby activating a sensor configured to sense a depression of said brake pedal; and
deactivating said cruise control activation switch, thereby deactivating said power pack.

* * * * *